Dec. 20, 1955  J. H. McFATRIDGE ET AL  2,727,449
ROTARY CROSSPLOW FOR PLANT ROW THINNING AND CULTIVATING
Filed June 3, 1953  2 Sheets-Sheet 1
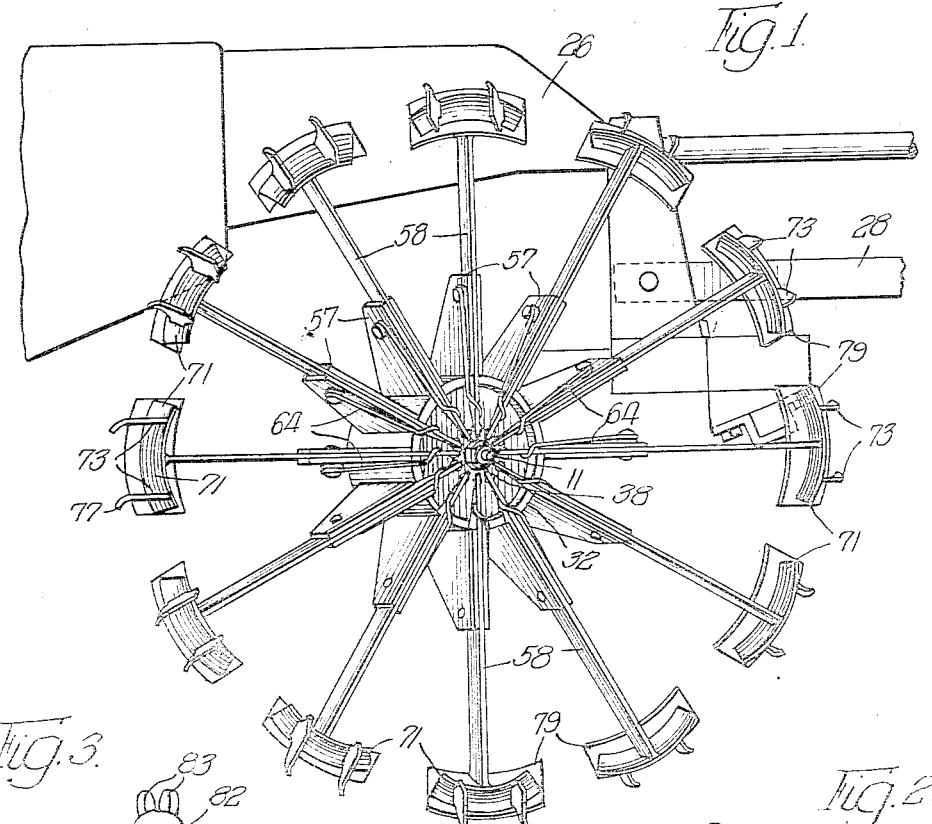
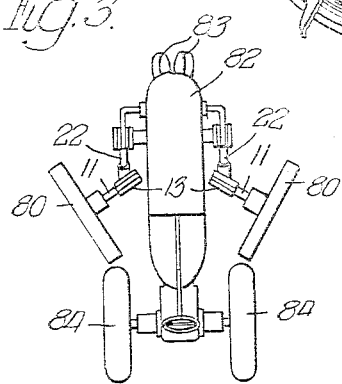
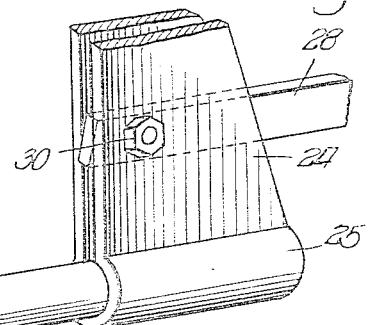
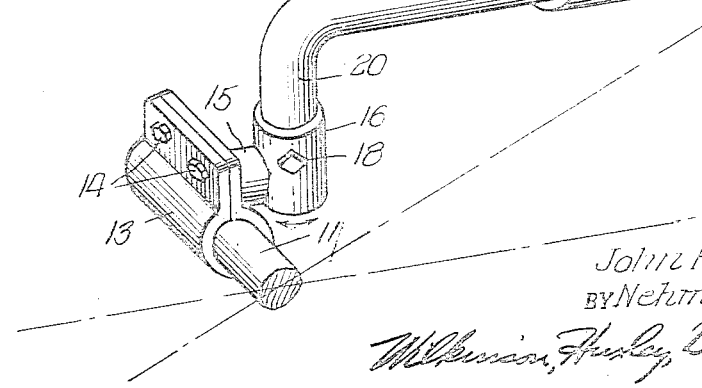
INVENTOR.
John H. McFatridge,
BY Nehman R. Duff

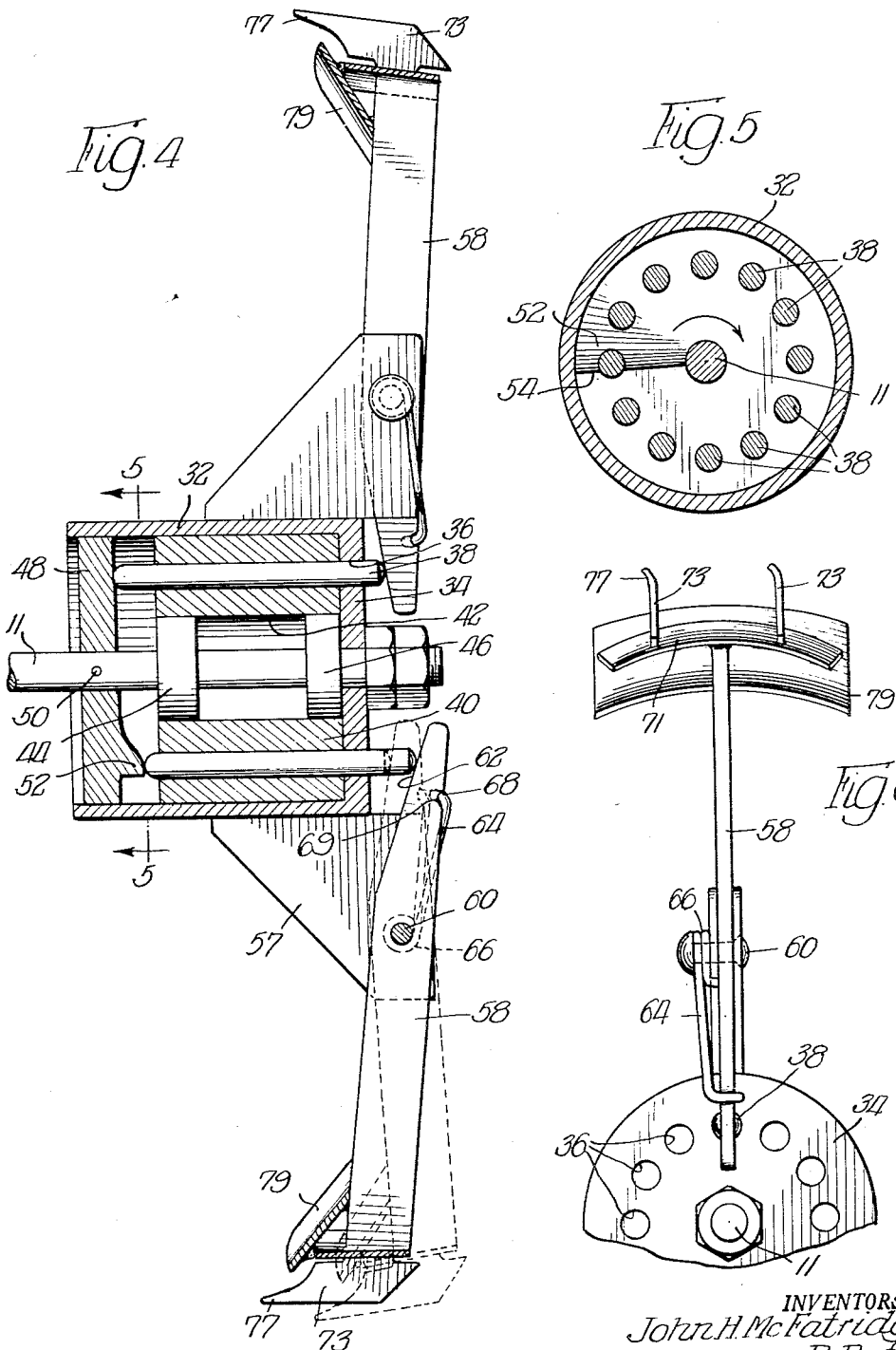

United States Patent Office 2,727,449
Patented Dec. 20, 1955

2,727,449

ROTARY CROSSPLOW FOR PLANT ROW THINNING AND CULTIVATING

John H. McFatridge and Nehman R. Duff, Pocahontas, Ark.

Application June 3, 1953, Serial No. 359,254

10 Claims. (Cl. 97—22)

This invention relates to a new and improved plant row thinning machine and more particularly to such a machine especially adapted for use as a cotton chopper, although suitable for use with other plants.

With cotton and some other plants, it is customary to plant a continuous row and after the plants are up to the height of a few inches, to thin them out. This leaves spaced clumps of plants which have been found to grow and produce better than a continuous row. Various machines have been developed for cotton chopping and the like. In general, such machines include wheels turned by contact with the ground and associated hoes which are cam controlled and spring operated to move under spring pressure to chop out the undesired plants.

It is an object of the present invention to provide a machine for thinning plant rows in which the thinning hoes are positively driven.

It is a further object to provide a machine including a plurality of circularly arranged hoes rotated about an axle by direct contact of the hoes with the ground.

It is also an object to provide a construction of this character in which the lower hoe surfaces carry digging blades which assist in rotating the assembly and also in chopping out the unwanted plants and moving the soil.

It is an additional object to provide such a construction in which the hoeing action is caused by cam means acting through a short arc whereby the hoes are maintained in retracted position except when performing the hoeing action.

It is another object to provide a construction which is simple in design and construction and adapted for commercial production and use.

Other and further objects will appear as the description proceeds.

We have shown certain preferred embodiments of our invention in the accompanying drawings in which—

Figure 1 is a perspective elevation of the row thinning machine with certain adjacent parts of the supporting tractor;

Figure 2 is a fragmentary view, on an enlarged scale, showing the supporting connection for the apparatus;

Figure 3 is a diagrammatic plan view, on a reduced scale, of the apparatus attached to the tractor;

Figure 4 is a vertical section through the apparatus;

Figure 5 is a section taken on line 5—5 of Figure 4; and

Figure 6 is a fragmentary rear elevation of a single hoe and its associated parts.

The construction comprises an axle 11 which, as shown in Figure 2, is supported in adjustable clamp 13, which clamp is connected by arm 15 to a sleeve 16. The sleeve 16 is secured by a set screw 18 to the downturned portion 20 of the support arm 22. This arm 22 is adjustably carried in the bracket 24 which is connected to the tractor 26, portions of which are shown in Figure 1. The bracing arm 28 is also connected to the tractor at a point not shown. The bolt 30, by its adjustment, serves to clamp the arm 22 in the rounded lower portion 25 of bracket 24. The arm 22, therefore, may be moved inwardly and outwardly of the bracket for adjustment purposes. Similarly, the collar 16 may be raised and lowered or rotated on the downturned portion 20 of arm 22. The clamp 13 which is clamped on axle 11 by bolts 14 also may have the axle 11 adjusted therein by loosening the bolts 14. It will be apparent that this supporting arrangement affords a wide range of adjustments of the location of the apparatus in relation to the tractor.

As shown in Figure 4, the axle 11 extends through a cylindrical housing 32 to which is permanently secured an outer closure 34 having a plurality of openings 36 through which extend push rods 38. These push rods 38 extend through openings in a tubular cylindrical block 40 permanently secured in place in the housing 32. The block 40 has an inner cylindrical opening 42 into which are fitted the bearings 44 and 46. These bearings may be of any usual anti-friction type and serve to support the assembly on the axle 11. The cam disc 48 closes the open end of housing 32, this disc 48 being secured to the axle 11 by pin 50 so that it remains stationary with the axle. This cam disc 48 has, on its inner face, a short cam rise 52 which has an abrupt drop-off face 54, as best shown in Figure 5.

Upon the outer face of housing 32 are secured a plurality of pairs of brackets 57 and an arm 58 is pivoted between each pair of brackets 57 on a pivot pin 60. Each arm 58 has an inner inclined surface 62 adapted to engage the outer end of an aligned push rod 38. The inner end faces 62 are held against the push rods 38 by the springs 64 which have a portion 66 wrapped around the pivot pin 60 and an end portion 68 hooked over and fitting in a notch 69 on the arm 58. The end of each arm 58 carries an arcuate ground contact plate 71 which, on its outer face, carries a pair of spaced ground engaging blades 73. As best shown in Figure 4, each blade 73 is provided with a pointed end 77, these ends 77 inclining forwardly of the direction of movement of the ground engaging portion of the assembly and rearwardly of the direction of movement of the tractor. The forward face of each arm 58 carries an inclined chopping hoe 79 having an arcuate sloping chopping face.

In Figure 3 there is a diagrammatic showing of the preferred manner of supporting the rotary apparatus from the tractor, the apparatus being designated by the general reference character 80 and the tractor by reference character 82, the front tractor wheels being shown at 83 and the rear wheels at 84. While the apparatus 80 may be connected to the tractor 82 so that its plane is parallel to the plane of the wheels of the tractor, it has been found preferable to turn it at an angle to that plane, the angle being preferably not greater than 45°. This results in the apparatus having a combined rolling, pushing and digging action as it is moved forward by the tractor. This causes the blades 73 to have a digging and dirt moving action in addition to functioning to cause the rotation of the entire chopping apparatus.

It will be noted from Figure 3 that the connection of the apparatus to the tractor is so made that the axle 11 is inclined outwardly and rearwardly from the center line of the tractor. Due to the inclination, the hoes 79 have a scooping action from the forward movement of the tractor. The contact of the hoes 79 with the earth and the effect of the digging in of the blades 73 holds the hoes 79 rearwardly so that the upper contact faces 62 of the arms 58 are held against their associated push rods 38. The cam rise 52 acting on the push rod 39 gives each hoe 79 a positive forward and inward scooping action as the blades 73 and hoe 79 reach full ground contact. This movement serves to effectively chop out the desired section from the row of plants. The chopping action is inwardly toward the tractor. The lines of ground contact of the apparatus may be adjusted as desired and may be between the lines of the treads of front and rear wheels or may be outside of the lines of the treads of the rear wheels. The height and angularity of the apparatus also may be adjusted by the supporting connection of Figure 2.

It is to be noted that the arms 58 and digging elements are all normally in substantially a flat circular plane. They are held in this position by the springs 64 with the exception of those lower arms which are in engagement with push rods 38 in contact with the short cam rise 52. This cam rise 52 serves to positively thrust the upper end face 62 of the arms 58 to the right, as seen in Figure 4, so as to positively move the chopping members 79 to the left from the broken line position to the full line position at the lower side of Figure 4. The chopping action is, therefore, accomplished by a positive drive and not by spring action. This causes an effective chopping which cannot be prevented by unusually hard soil conditions or other similar obstructions. The springs 64 serve merely to hold the arms in their normal position and do not affect the chopping action. It will be noted from Figure 1 that the arms 58 are so spaced and the chopping hoes 79 are so proportioned and spaced that they leave unchopped clumps of plants between them as the apparatus progresses along the rows.

While we have shown and described certain preferred forms of our invention, these are to be understood to be illustrative only as it is capable of variation to meet differing conditions and requirements. We, therefore, contemplate such modifications as come within the spirit and scope of the appended claims.

We claim:

1. Plant row thinning apparatus for attachment to a tractor comprising an axle, a housing rotatably supported on said axle, a plurality of radial arms pivotally supported on said housing, each arm having a ground contact plate at its outer end, a downwardly and outwardly inclined ground digging hoe carried by each arm adjacent the ground contact plate, cam means fixedly secured to the axle, and means operatively connecting the cam means and radial arms to move the outer ends of the arms positively in at least one direction as the contact with the ground by the ground contact plates rotates the housing and associated parts about the axle during movement of the tractor.

2. Plant row thinning apparatus for attachment to a tractor comprising an axle, a housing rotatably supported on said axle, a plurality of radial arms pivotally supported on said housing, each arm having a ground contact plate at its outer end, a downwardly and outwardly inclined ground digging hoe carried by each arm adjacent the ground contact plate, the lower edge of the hoe extending outwardly beyond the ground contact plate, cam means fixedly secured to the axle, and means operatively connecting the cam means and radial arms to move the outer ends of the arms positively to cause a digging action by the hoes when in contact with the ground as the contact with the ground by the ground contact plates rotates the housing and associated parts about the axle during movement of the tractor.

3. Plant row thinning apparatus for attachment to a tractor comprising an axle, a housing rotatably supported on said axle, a plurality of radial arms pivotally supported on said housing, each arm having a ground contact plate at its outer end, a downwardly and outwardly inclined ground digging hoe carried by each arm adjacent the ground contact plate, the lower edge of the hoe extending outwardly beyond the ground contact plate, cam means fixedly secured to the axle, and means operatively connecting the cam means and radial arms to move the outer ends of the arms positively to cause a digging action by the hoes when in contact with the ground as the contact with the ground by the ground contact plates rotates the housing and associated parts about the axle during movement of the tractor, and spring means for returning the arms to normal position after said digging action.

4. Plant row thinning apparatus for attachment to a tractor comprising an axle, adjustable means for connecting the axle to the tractor through a range of elevations and angular positions, a cam member fixedly secured to the axle, a housing enclosing the cam member and rotatably supported on the axle, a plurality of arms pivotally supported on the housing, each arm having a laterally faced downwardly and outwardly inclined ground digging hoe adjacent its outer end, each arm having a ground contact plate at its outer end, said ground contact plates serving to rotate the housing and supported parts upon movement of the tractor, and means operatively connecting the cam member and arms to move the arms to give a digging action to hoes adjacent the ground.

5. The apparatus of claim 4 in which the axle is supported from the tractor at an angle rearwardly of a line normal to the longitudinal axis of the tractor, said angle being less than 45°.

6. The apparatus of claim 5 in which the digging action of the hoes is inclined forwardly toward the longitudinal axis of the tractor.

7. Plant row thinning apparatus for attachment to a tractor comprising an axle, adjustable means for connecting the axle to the tractor, a cam member fixedly secured to the axle, a housing rotatably mounted on the axle, a plurality of radially extending arms pivotally mounted on the housing, each arm having a ground contact plate at its outer end and a downwardly and outwardly inclined ground digging hoe adjacent its outer end, push rods carried in the housing and having ends engaging the cam member, the opposite end of each push rod engaging the inner end of an arm so that the cam gives a positive swinging movement to the arms as the housing rotates about the axle due to the contact of the ground contact plates with the ground as the tractor moves.

8. Plant row thinning apparatus for attachment to a tractor comprising an axle, adjustable means for connecting the axle to the tractor, a cam member fixedly secured to the axle, a housing rotatably mounted on the axle, a plurality of radially extending arms pivotally mounted on the housing, each arm having a ground contact plate at its outer end and a downwardly and outwardly inclined ground digging hoe adjacent its outer end, push rods carried in the housing and having ends engaging the cam member, the opposite end of each push rod engaging the inner end of an arm so that the cam gives a positive swinging movement to the arms as the housing rotates about the axle due to the contact of the ground contact plates with the ground as the tractor moves, and spring means for holding the inner ends of the arms in contact with the adjacent ends of the push rods.

9. Plant row thinning apparatus for attachment to a tractor comprising an axle, adjustable means for connecting the axle to the tractor, a cam member fixedly secured to the axle, a housing rotatably mounted on the axle, a plurality of radially extending arms pivotally mounted on the housing, each arm having a ground contact plate at its outer end and a laterally faced ground digging hoe adjacent its outer end, transverse ground digging blades mounted on the outer faces of the ground contact plates, push rods carried in the housing and having ends engaging the cam member, the opposite end of each push rod engaging the inner end of an arm so that the cam gives a positive swinging movement to the arms as the housing rotates about the axle due to the contact of the ground contact plates and ground digging blades with the ground as the tractor moves.

10. The apparatus of claim 9 in which the transverse digging blades have digging points under the hoes, said points being inclined forwardly of the direction of movement of the lower arms in the operation of the apparatus.

References Cited in the file of this patent

UNITED STATES PATENTS

| | | |
|---|---|---|
| 77,292 | Kidd | Apr. 28, 1868 |
| 697,028 | Shields | Apr. 8, 1902 |
| 811,106 | Sutton | Jan. 30, 1906 |
| 1,775,711 | Aitkenhead | Sept. 16, 1930 |
| 1,806,376 | Veselka | May 19, 1931 |
| 2,137,233 | Brotzman | Nov. 22, 1938 |